Oct. 18, 1949.  E. F. AHRENS  2,485,081
TREE STAND
Filed June 19, 1948

INVENTOR
Emmett F. Ahrens,
BY Geo Stevens
ATTORNEY

Patented Oct. 18, 1949

2,485,081

UNITED STATES PATENT OFFICE 2,485,081

TREE STAND

Emmett F. Ahrens, Aitkin, Minn.

Application June 19, 1948, Serial No. 34,087

2 Claims. (Cl. 248—38)

This invention relates to a stand or base for supporting Christmas trees or the like.

One of the principal objects of the instant invention is to provide an inexpensive tree stand capable of being mass produced, and one which will be practical for household use.

Another object is to provide a tree stand on which it is easy to mount a tree and in which no separate fastening means is needed.

A further object is to provide a tree stand which is foldable into a small package for storage and wherein the parts will not become lost during the period of non-use as they are all secured together.

A more specific object is to provide an inexpensive tree stand having a reenforced sheet metal base and brace arms whereby a tree may be sturdily supported.

Other objects and advantages will appear as the description of the invention proceeds.

In the accompanying drawing forming a part of this application:

Fig. 3 is a vertical sectional view through an outer edge of the base to illustrate the formation thereof.

Figure 1:
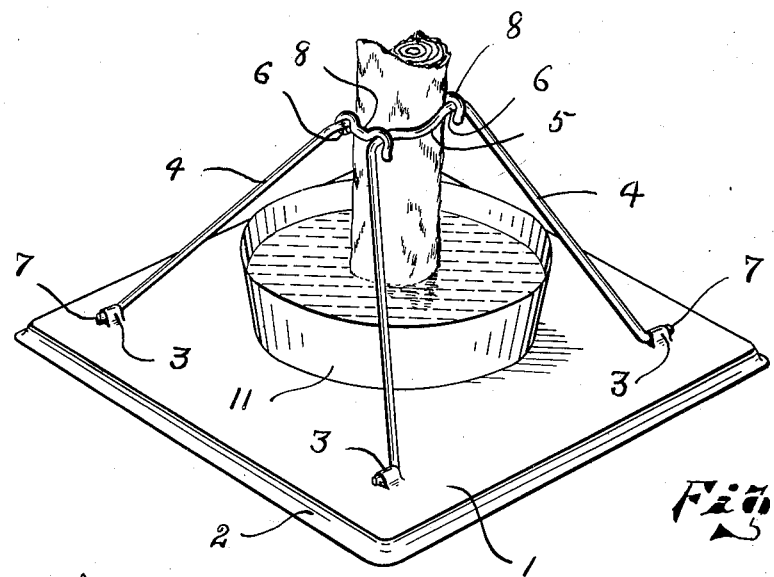
Fig. 1 is a perspective view of one simple form of the invention in use.

In the drawing the reference numeral 1 indicates a base portion, preferably of sheet metal, having the outer edges thereof bent downwardly and outwardly as clearly shown in Fig. 3 to form a reenforcing flange 2 entirely around the base member. This flange 2 serves to reenforce the base 1 and prevents its being bent by any stress which a tall tree may exert on same when leaning in one direction or the other. The reenforcing flange will permit the base portion to be made of lighter gauge material than would otherwise be possible and thereby cuts the cost of manufacture materially.

In Fig. 1, the base member is shown as being substantially square which may be the preferred form of base, especially for stands for smaller trees. The base portion has a plurality of strips 3 stamped upwardly therefrom to form means to pivotally receive the ends of the brace members 4. There are, preferably, only two opposed substantially U-shaped brace members as shown in Fig. 1, each of which is formed of a single piece of stiff spring wire or rod of suitable gauge which is strong enough to accomplish the purpose, and which may vary with the size of tree that is to be supported.

The central portion of each of the rods or wires forming the brace members has an arcuate portion 5 bent therefrom and adjacent each end of the latter, a short straight portion 6 from which the bracing portions of the members extend outwardly and downwardly, the extreme ends of the brace members being bent outwardly as at 7 to be pivotally received in the eyes formed by the strips 3. The wires or rods being of spring material, the U-shaped brace members may be sprung together to be inserted into the openings formed by the strips 3 for assembling the tree stand.

The arcuate portions 5 are shaped to fit the average curvature of the trunk of the tree to be held by the stand, and, preferably have the tree engaging face thereof flattened (though not shown in the drawing) to provide for firmer grip of the tree trunk. Suitable means, such as the hooks 8, are provided to bridge the gap between the opposed straight portions 6 and clamp the two brace members together with the arcuate portions 5 firmly gripping the tree trunk, the spring quality of the wire or rods serving to compensate for the various sizes of tree trunks which may be held. As shown in Fig. 1, the hooks 8 are installed on the straight portions 6 of one of the brace members and are engaged over the straight portions 6 of the opposed member to clamp the trunk of a tree securely between the arcuate holding portions 5.

Centrally of the base 1 a spike or tine 9 having a shoulder or collar 10 is installed to project upwardly from the base, the lower end of the tree trunk being centrally placed on the spike and the spike being forced into the tree trunk longitudinally thereof, thereby providing a non-slip connection for the butt end of the tree which cooperates with the clamped brace members to maintain the tree in the desired upright position.

Figure 2:
Fig. 2 is a central sectional view through the spike or tine on which the tree is set, and illustrates the fastening of a water pan to the base portion.

Provision has been made for a pan 11 in which water may be held to aid in keeping the tree fresh. The pan 11 is installed and held on the base 1 by means of the spike 9 as illustrated in Fig. 2. The base 1 and pan 11 have an opening or hole centrally therethrough through which the spike 9 extends, the collar 10 being on the upper side thereof. A rubber gasket or washer 12 is placed intermediate of the collar 10 and the pan and the lower end of the spike is inserted through the hole in the base; then the lower end of the spike 9 is riveted or flattened down to hold the pan securely fastened to the base and at the same time, the rubber gasket is compressed intermediate of the bottom of the pan and the collar 10 as shown which results in a water tight connection of the parts.

Of course, if desired the pan may be omitted and the spike 9 riveted in place on the base in the same manner above described to hold it in place.

Figure 4:
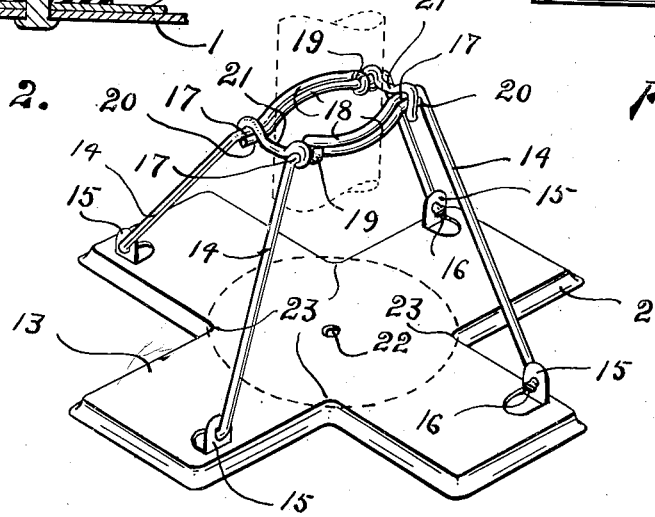
Fig. 4 is a perspective view showing modified forms of elements of the tree stand shown in Fig. 1.

Fig. 4 discloses modifications of the device shown in Fig. 1.

The base member 13 in Fig. 4 is of somewhat Greek cross shape which permits its being cut from sheet material with but little waste of material along the edges of the sheet. The marginal edges of the base 13 are also flanged for reenforcement in the same manner as the base 1 to provide additional strength to the base.

A modified form of brace members 14 is also shown in Fig. 4 as well as a means for pivotally mounting the brace members on the base, the latter comprising a lug 15 struck from the base and having a hole therein to receive one end of the brace member.

The brace members 14 are made in opposed pairs, each member having one end bent and inserted through the hole in a lug 15 and then the end is flattened as at 16 to prevent its being removed from the hole, thereby providing a permanent pivotal connection for the brace members to the base.

The upper end of each brace member is bent to form a straight portion 17 similar to the portion 6, Fig. 1 and an arcuate gripping portion 18 similar to the portion 5, Fig. 1.

In each of the said opposed pairs of brace members, the outer end of one is bent into a hook 19 to engage on the straight portion 17 of its mate, while the outer end of the other one ends with a straight portion 20 projecting from the arcuate gripping portion.

A fastening means, such as a hook 21, is pivotally installed on the straight portion 17 of the one of the members of the pair on which the hook 19 is engaged, and the said fastening hook is engaged over the straight portion 17 and free straight end 20 of the opposed pair to form a secure connection of the brace members to firmly hold a tree trunk therebetween.

A hole 22 is provided centrally of the base 13 to permit the installation of a spike such as the one 9.

In the event that a large and very heavy tree is to be supported by the instant tree stand, the base 13 shown in Fig. 4 provides additional strength for the base for such purpose, in that the reenforcing flanges extend inwardly adjacent the center of the base where the weight of the tree will rest, and, in the event that a water pan is employed, the bottom of same will provide additional strength for supporting the tree, especially if the outer edge of the pan bottom extends over and rests on the reenforcing flange at the inside corners 23 of the base as shown in dotted lines Fig. 4.

For storage purposes the brace members may be folded inwardly and overlap each other so that very little storage space would be occupied, and the parts need not be disassembled in any way for such storage, thereby preventing their loss.

It is to be understood that various modifications and changes may be made in the construction of my invention without departure from the spirit thereof, and that I do not wish to be limited to the specific details of construction shown and described herein except as pointed out in the claims.

Having thus described my invention, what I claim is:

1. As a new article of manufacture a tree stand comprising a sheet metal base member having its marginal edges pressed downwardly to form reenforcing means, lugs struck upwardly from said base, brace members pivotally carried by said lugs on said base member and having arcuate portions adapted to engage the trunk of a tree in spaced relation to its butt end, a spike projecting upwardly from said base and being adapted to carry the butt end of the tree, and hooks adjacent the arcuate portions of said brace members to secure the latter together and cause same to firmly grip a tree trunk.

2. A tree stand comprising a sheet metal base member having its outer edges pressed downwardly, lugs pressed upwardly from said base, brace members pivotally carried by said lugs on said base member and having an arcuately shaped gripper portion to engage a tree trunk, a spike protruding from said base to hold the butt end of a tree, and hooks on said brace members to secure said gripper portions on a tree trunk in spaced relation to the butt end thereof.

EMMETT F. AHRENS.

REFERENCES CITED

The following references are of record in the file of this patent:

UNITED STATES PATENTS

| Number | Name | Date |
| --- | --- | --- |
| 923,206 | Singleton | June 1, 1909 |
| 1,015,934 | Black | Jan. 30, 1912 |
| 1,721,980 | Wardell | July 23, 1929 |
| 1,448,304 | Irwin | Nov. 11, 1930 |
| 1,912,054 | Wright | May 30, 1933 |
| 2,448,304 | Gabel | Aug. 31, 1948 |
| 2,463,780 | Korrol | Mar. 8, 1949 |